United States Patent
Kuipers et al.

(10) Patent No.: US 10,419,279 B2
(45) Date of Patent: Sep. 17, 2019

(54) SELECTIVELY UTILIZING INTERFACES OF A NETWORK ACCESS DEVICE FOR CONFIGURATION PURPOSES

(71) Applicant: ADTRAN GmbH, Munich (DE)

(72) Inventors: Martin Kuipers, Dallgow-Döberitz (DE); Uwe Jank, Berlin (DE)

(73) Assignee: Adtran GmbH, Munich (DE)

( * ) Notice: Subject to any disclaimer, the term of this patent is extended or adjusted under 35 U.S.C. 154(b) by 186 days.

(21) Appl. No.: 15/408,723

(22) Filed: Jan. 18, 2017

(65) Prior Publication Data
US 2017/0214569 A1 Jul. 27, 2017

(30) Foreign Application Priority Data
Jan. 22, 2016 (EP) ..................................... 16152475

(51) Int. Cl.
G06F 15/177 (2006.01)
G06F 15/16 (2006.01)
H04L 12/24 (2006.01)

(52) U.S. Cl.
CPC .......... *H04L 41/0803* (2013.01); *H04L 41/08* (2013.01); *H04L 41/0869* (2013.01); *H04L 41/0883* (2013.01)

(58) Field of Classification Search
CPC ............. H04L 41/0803; H04L 41/0869; H04L 41/0883; H04L 41/08
USPC ......... 709/202–203, 217–219, 220–222, 250
See application file for complete search history.

(56) References Cited

U.S. PATENT DOCUMENTS

| | | | |
|---|---|---|---|
| 6,012,100 A | 1/2000 | Frailong et al. | |
| 6,753,887 B2* | 6/2004 | Carolan | H04L 12/2801 709/219 |
| 7,031,267 B2* | 4/2006 | Krumel | H04L 41/0803 370/255 |
| 9,191,275 B1 | 11/2015 | Worsley | |
| 9,900,219 B2* | 2/2018 | Huey | H04L 41/0893 |
| 10,250,411 B2* | 4/2019 | Yang | H04L 12/4666 |
| 2004/0249918 A1* | 12/2004 | Sunshine | H04L 41/0846 709/223 |
| 2008/0199180 A1* | 8/2008 | Yang | H04L 12/4666 398/58 |
| 2010/0196011 A1* | 8/2010 | Liu | H04J 14/0246 398/79 |
| 2014/0280807 A1 | 9/2014 | Bencheck | |

(Continued)

OTHER PUBLICATIONS

Extended European Search Report for EP Application No. 16152475.6 dated Jul. 5, 2016, 6 pages.

(Continued)

*Primary Examiner* — Bharat Barot
(74) *Attorney, Agent, or Firm* — Fish & Richardson P.C.

(57) ABSTRACT

Methods, devices, systems and computer readable medium for utilizing interfaces of a network access device are provided. A network access device includes a subscriber interface with at least one subscriber port and a network interface. Methods include (i) checking whether configuration data can be obtained via the network interface; (ii) if the configuration data cannot be obtained from the network interface, checking a predefined condition at the subscriber interface; and (iii) if the predefined condition is fulfilled, enabling the subscriber interface for configuration purposes. Furthermore, an according device and a system are suggested.

15 Claims, 2 Drawing Sheets

(56) References Cited

U.S. PATENT DOCUMENTS

2015/0016241 A1    1/2015  Ruffini et al.
2016/0094388 A1*   3/2016  Britt, Jr. .............. H04L 41/0816
                                                              370/254

OTHER PUBLICATIONS

European Communication Pursuant to Article 94(3) EPC for EP 16 152 475.6, dated Nov. 28, 2018, 5 pages.

* cited by examiner

SELECTIVELY UTILIZING INTERFACES OF A NETWORK ACCESS DEVICE FOR CONFIGURATION PURPOSES

The document relates to utilizing interfaces of a network access device and to an according network access device.

BACKGROUND

A fiber to distribution point architecture (FTTdp) is used to provide very high speed internet access to residential and business customers without the need to install optical fibers in the premises of the subscribers. This is realized by installing so-called Distribution Point Units (DPUs) in the vicinity of the subscriber. The DPU can provide internet access over the last short part of the existing copper network at a speed that could traditionally only be realized by fiber based access.

SUMMARY

In general, one innovative aspect of the subject matter described in this specification can be embodied in methods for to utilizing interfaces of a network access device. The network access device can include a subscriber interface with at least one subscriber port and a network interface. Methods can include the actions of checking whether configuration data can be obtained via the network interface; if the configuration data cannot be obtained from the network interface, checking a predefined condition at the subscriber interface; if the predefined condition is fulfilled, enabling the subscriber interface for configuration purposes. Other embodiments of this aspect include corresponding systems, devices, apparatus, and computer readable medium.

These and other embodiments can each optionally include one or more of the following features. Methods can include, if the predefined condition is not fulfilled, not enabling the subscriber interface for configuration purposes.

The network access device can be a distribution point unit or a multi-dwelling unit. The subscriber interface can include several subscriber line ports, each of which being connectable to a customer premises equipment. The network interface can include at least one optical interface that is connectable directly or via an optical splitter to a central office. The configuration data can be used to configure the network access device.

Methods can include, if the configuration data can be obtained from the network interface, using such configuration data for configuring the network access device.

Methods can include, if the predefined condition is fulfilled, enabling the subscriber interface for configuration purposes, wherein the subscriber interface is used for obtaining configuration data from a terminal that is directly or indirectly connectable to at least one subscriber line port of the subscriber interface; and using such configuration data for configuring the network access device.

The terminal can be indirectly connectable to the at least one subscriber line port of the subscriber interface via a media converter.

The predefined condition can specify that at least one port of the subscriber interface is not connected to a subscriber. The predefined condition can specify that no port of the subscriber interface is connected to a subscriber. The predefined condition can require a successful identification and/or authentication at the subscriber interface.

DESCRIPTION OF THE DRAWINGS

Like reference numbers and designations in the various drawings indicate like elements.

DETAILED DESCRIPTION

Figure 1:
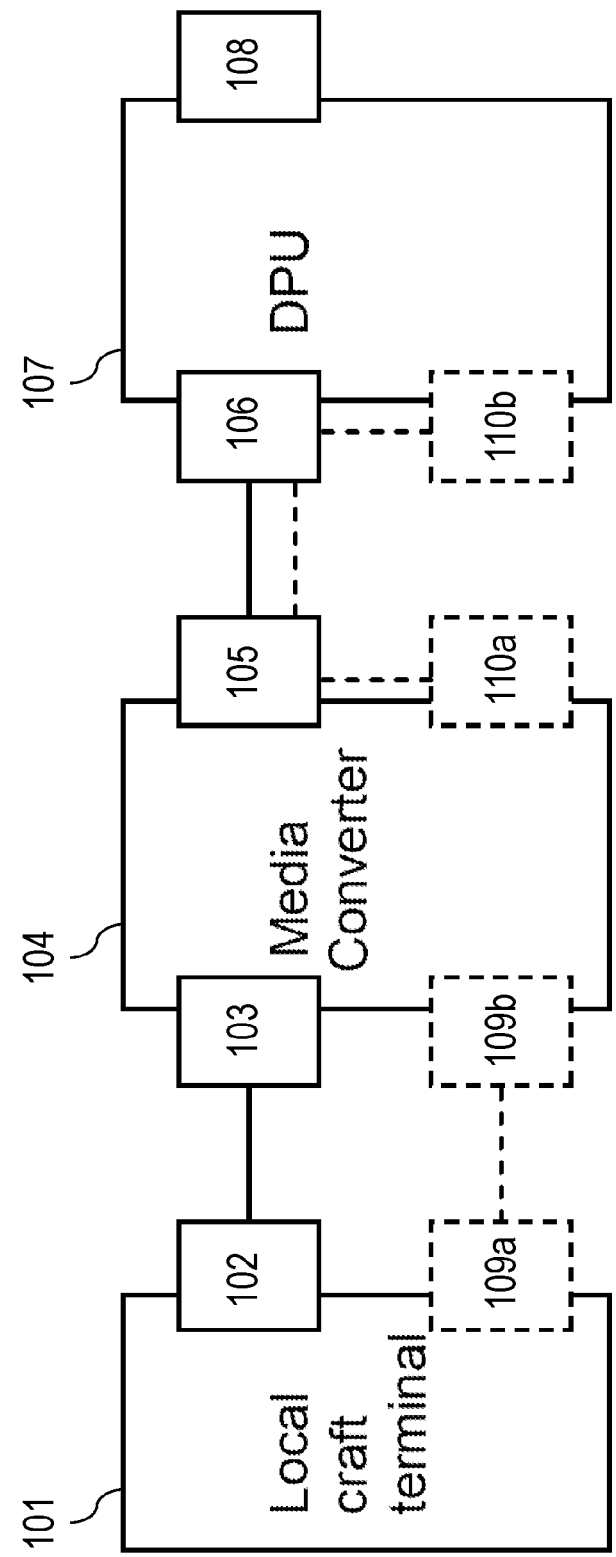
FIG. 1 shows a schematic view of an example hardware setup comprising a local craft terminal with authorization and/or configuration software to configure a DPU via (at least) one of its downlink ports.

Since DPUs are installed rather deep in the network the amount of subscribers connected to a DPU is relatively small (e.g., 8 to 16 subscribers). Hence, there is a high amount of DPUs installed in the operator's network.

It may be difficult to power the DPUs locally, because there may be no (easy) means for powering the DPU. It is known to reversely power the DPU via the CPE over the existing access loops. The DPU is often unpowered when it is installed in the network, because at the time of such installation there is no subscriber available to reversely power the DPU.

Hence, the DPU can be configured first time as follows:
(a) An autonomous discovery procedure is used that retrieves a valid configuration via an uplink media interface when the DPU is powered for the first time.
(b) Each DPU has to be individually preconfigured prior to its installation. If it is later powered up for the first time, it uses this preconfigured installation.

The approach (a) bears the disadvantage that such discovery procedure may fail and the configuration becomes corrupted. Also, a wrong configuration may prevent access and/or disable the DPU and make any further configuration via the discovery procedure impossible. This then requires to costly repair by replacing or by reconfiguring the DPU manually at the location of the DPU.

The approach (b) is highly inflexible and requires to know the configuration before the CPEs are actually installed.

This becomes even more problematic in case the DPU does not have an external port that can be used for (re-) configuration purposes. For cost, environmental and/or security reasons, such external port (e.g., a serial port that can be used to get connected to a remote terminal, e.g., a laptop computer) may be deliberately omitted. Instead, a management channel is used in-band on the DPU's uplink media. Such uplink media might be an optical fiber connection (e.g., GPON) towards a central office (CO). Such optical uplink media, however, is an expensive technology to interface with a simple remote terminal.

In order to overcome this problem, a method is suggested for utilizing interfaces of a network access device,
wherein the network access device includes a subscriber interface with at least one subscriber port and a network interface,
the method comprising:
checking whether configuration data can be obtained via the network interface;
if the configuration data cannot be obtained from the network interface, checking a predefined condition at the subscriber interface;
if the predefined condition is fulfilled, enabling the subscriber interface for configuration purposes.

Advantageously, the network access device allows being configured via its subscriber interface in case the uplink configuration attempt via the network interface is not possible or successful. Hence, being unable to obtain configuration data via the uplink (i.e. network interface), the network access device enables a mode that allows its configuration to be conducted through its downlink interface (i.e. the subscriber interface). This is possible, if the predefined condition is met.

In some implementations, the method includes the step:
if the predefined condition is not fulfilled, not enabling the subscriber interface for configuration purposes.

The method according to any of the preceding claims, wherein the network access device is a distribution point unit or a multi-dwelling unit.

In some implementations, the subscriber interface includes several subscriber line ports, each of which being connectable to a customer premises equipment.

In some implementations, the network interface includes at least one optical interface that is connectable directly or via an optical splitter to a central office.

In some implementations, the configuration data is used to configure the network access device.

Configuration in this regard may comprise reading data from the network access device, setting up at least one parameter, repairing, troubles shooting or diagnostics tasks conducting at or for the network access device.

In some implementations, the method further includes:
if the configuration data can be obtained from the network interface, using such configuration data for configuring the network access device.

In some implementations, the method includes:
if the predefined condition is fulfilled, enabling the subscriber interface for configuration purposes, wherein the subscriber interface is used for obtaining configuration data from a terminal that is directly or indirectly connectable to at least one subscriber line port of the subscriber interface;
using such configuration data for configuring the network access device.

In some implementations, terminal is indirectly connectable to the at least one subscriber line port of the subscriber interface via a media converter.

In some implementations, the predefined condition specifies that at least one of the ports of the subscriber interfaces is not connected to a subscriber.

In some implementations, the predefined condition specifies that none of the ports of the subscriber interface is connected to a subscriber.

For example, it may be determined if no signal is available at any of the subscriber line ports of the subscriber interface. In this case the predefined condition may be met. Also, a group of subscriber line ports may be identified to fulfil the predefined condition, i.e. not being connected to subscribers.

In some implementations, the predefined condition specifies a successful identification and/or authentication at the subscriber interface.

Hence, such identification and/or authentication may be one condition to be met to allow configuration of the network access device via its subscriber interface. It is noted that several conditions can be combined (e.g., all such conditions may have to be fulfilled) to configure the network access device through its subscriber interface.

An identification and/or authentication may refer to a user, a program and/or a device.

Also, a network access device is suggested, said network access devices comprising:
a subscriber interface with at least one subscriber port;
a network interface;
a processing unit, wherein the processing unit is arranged to check whether configuration data can be obtained via the network interface;

if the configuration data cannot be obtained from the network interface, checking a predefined condition at the subscriber interface; and
if the predefined condition is fulfilled, enabling the subscriber interface for configuration purposes.

In addition a system is provided comprising:
the network access device as described herein; and
a terminal for configuring the network access device via its subscriber interface.

Also a system is provided comprising:
the network access device according as described herein;
a media converter; and
a terminal for configuring the network access device via its subscriber interface via the media converter.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further includes a computer program product directly loadable into a memory of a digital computer, including software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

Advantageously, the examples provided herein allow for a cost-efficient configuration and/or diagnostics of a network access device, e.g., a DPU. The network access device may include:
a subscriber interface on an aggregation side with several subscriber line ports, which can be connected to subscribers, e.g., CPEs; and
at least one (optical) network terminal (uplink media), which is connected, e.g., via GPON to a CO or the like.

The connection towards the subscribers is also referred to as downlink, the subscriber interface is thus referred to as downlink interface. Accordingly, the connection towards the (optical) network is also referred to as uplink and the network interface of the network access device is referred to as uplink interface.

The network access device provides a number of (subscriber line) ports for internet access via subscriber lines. The subscriber line may be a phone cable or a coax cable connected to telecommunication service. Each of these ports can establish a data connection according to specific DSL and/or G.fast recommendations. It is noted that here DSL or G.fast are mentioned as example communication standards. However, other communication standards may be used accordingly with regard to the examples described herein.

Also, the network access device may provide transport of such data traffic via its uplink media, which may be at least one optical fiber to a telecommunication service network.

The network access device may provide switching or routing functionalities for the data traffic. As an option, the network access device may comprise a memory for storing configuration data persistently.

As an example network access device, reference is made to the DPU. However, other network access devices may be used accordingly. An example for another network access device is a multi-dwelling unit (MDU).

In some implementations, a subscriber line port may be used to provide access for a local craft terminal. The local craft terminal may be a remote terminal, e.g., a personal computer, which may directly or indirectly be connected to the subscriber line port of the DPU. Hence, the local craft terminal can be used for setting up, configuring or repairing the DPU on-site. It is noted that the term "configuration" in this regard may imply loading new or amended data, in particular configuration information, onto the DPU, erasing data on the DPU or flashing the DPU with (amended) data. Data may comprise configuration information as well as programs (to be executed on the DPU). In addition, such configuration may comprise an authorization of the user, the local craft terminal and/or the software running on the local craft terminal. Depending on the level of security and/or safety required, various encryption, identification and/or authentication mechanisms may be applied, in particular combined with each other.

For practical and for security reasons the local craft terminal may preferably not simply be a CPE to perform configuration, diagnostics, or repair tasks. In fact, in many use cases it may have to be avoided that a common CPE is capable to configure the DPU via the DPU's subscriber interface. Advantageously, the DPU may have to distinguish if a regular subscriber (e.g., CPE) is connected to the subscriber line port of the DPU or if administrative actions need to be performed.

Hence, at least one subscriber line port is used to provide access for the local craft terminal. The local craft terminal is thus capable of conducting a configuration of the DPU. Such configuration may comprise setting up parameters of the DPU, repairing the DPU, updating the DPU, troubleshooting, diagnostics, etc. Such configuration occurs preferably in case the DPU has entered a configuration mode. This configuration mode allows the DPU to receive configuration information via its subscriber interface, e.g., from said local craft terminal.

The configuration information may be utilized by the DPU, after it has entered a normal mode of operation (also referred to as CO-mode). In the normal mode of operation, at least one CPE may be operated via at least one of the DPU's subscriber interface and the network (uplink) interface of the DPU may be connected (directly or indirectly) to the CO.

In the configuration mode, the DPU may expect a configuration application, which may run on the local craft terminal. Such configuration application may utilize the DPU's subscriber interface to get connected to a management software that is executed at the DPU.

The communication between the local craft terminal and the DPU in the configuration mode may utilize signals conveyed at predefined frequencies, e.g., handshake signals. Such frequencies may comprise at least one frequency that cannot be generated by common CPE hardware. This further increases the security of and during the configuration mode, in case such configuration mode should not be entered or misused by the CPE hardware. The frequencies used by the local craft terminal may, e.g., be below a cutoff frequency of the CPE's signal path. Entering such configuration mode may be triggered by dedicated software and/or hardware (firmware) of the local craft terminal.

Hence, the configuration mode allows configuration of the DPU via its at least one subscriber line port (subscriber interface), which is not possible during normal operation of the DPU. Accordingly, entering the configuration mode required to meet at least one predefined condition.

Using this at least one subscriber line port in the configuration mode has the advantage that the local craft terminal connected to this at least one subscriber line port assumes the role of the CO, which cannot be done by a regular CPE. Hence, the regular CPE connected to the subscriber line port cannot inadvertently or on purpose exploit the DPU's configuration mode, which may be a requirement of an operator to avoid an unwanted configuration of the DPU via the CPE.

An example procedure to perform an administrative task via the local craft terminal on the DPU may be as follows.

Determine a situation that access by a local craft terminal is needed.

Ensure that no CPE is connected to at least one subscriber line port of the DPU; it may in particular determined that a certain type of subscriber line ports, e.g., so-called dedicated port(s), are not connected to CPEs. The term "connected to CPE" in this regard may comprise that no active CPE is determined at the respective subscriber line port of the DPU.

Set the at least one subscriber line port in the configuration mode.

Connect a device (e.g., said local craft terminal) to the at least one subscriber line port that is able to configure the DPU; the device may be a local craft terminal that is connected, e.g., via a media converter to the at least one subscriber line port of the DPU. It is an option that the media converter is an (integral) part of the local craft terminal.

Establish a data connection between the device and the DPU via the at least one subscriber line port. It is noted that the data connection may be initiated by the device and/or by the DPU.

Perform administrative tasks via the device (e.g., local craft terminal).

As indicated, the local craft terminal may be a remote PC, laptop, smartphone, tablet or any remote terminal that can be directly or indirectly connected to the at least one subscriber line port.

FIG. 1 shows a schematic view of an example hardware setup comprising a local craft terminal 101 with authorization and/or configuration software to configure a DPU 107.

The local craft terminal 101 has a port 102 (e.g., an USB or Ethernet port) to receive and/or transmit data to and from a media converter 104. The media converter 104 has a port 103 to receive and/or transmit data to and from the local craft terminal 101. Hence, the port 102 is connected to the port 103.

The media converter 104 includes at least one subscriber line port 105, which is connected to at least one subscriber line port 106 of the DPU 107. The DPU 107 includes at least one uplink media port 108, e.g., an optical interface towards, e.g., a CO.

As an option, the local craft terminal 101 may comprise a power supply interface 109a, which is connected to a power supply interface 109b of the media converter 104. Hence, the local craft terminal 101 may supply power towards the media converter 104. It is also an option that the media converter 104 includes a power supply interface 110a, which is connected (e.g., across the subscriber line ports and 106) to a power supply interface 110*b* of the DPU. This allows the DPU to be reverse-powered by the local craft terminal 101.

Hence, the solution presented herein in particular refers to an network access device, e.g., a DPU 107, which may not have or require a separate physical port for connecting the local craft terminal. In addition, no expensive technology is required at the local craft terminal for getting connected to high bandwidth fiber technologies at the network access device's uplink port. Instead, the less complex and less expensive technology of a subscriber line is used for connecting the local craft terminal and for configuration, repair, etc. tasks for the network access device.

Cheap and small devices are available for technologies used on subscriber lines, which can terminate one or more subscriber line and forward any type of data (e.g., Ethernet data traffic) to and from a port, which can be connected to the local craft terminal, e.g., Ethernet, Wireless LAN, Bluetooth, USB. Such device providing connectivity between the local craft terminal 101 and the DPU 107 is also referred to as the media converter 104. This media converter 104 may be powered by the local craft terminal 101, e.g., via USB powering. Additionally, the media converter 104 may power-up the DPU 107 if that is required and applicable (e.g. in case of reverse-powered DPUs). It is also an option that the media converter 104 is part of the local craft terminal 101.

In order to become configured via the local craft terminal 101, the DPU 107 may provide a special procedure, wherein the DPU 107 automatically detects whether it obtains its configuration via the in-band management channel from its uplink media port 108 or via the local craft terminal 101 connected to at least one of its subscriber line ports 106 via the media converter 104.

Figure 2:
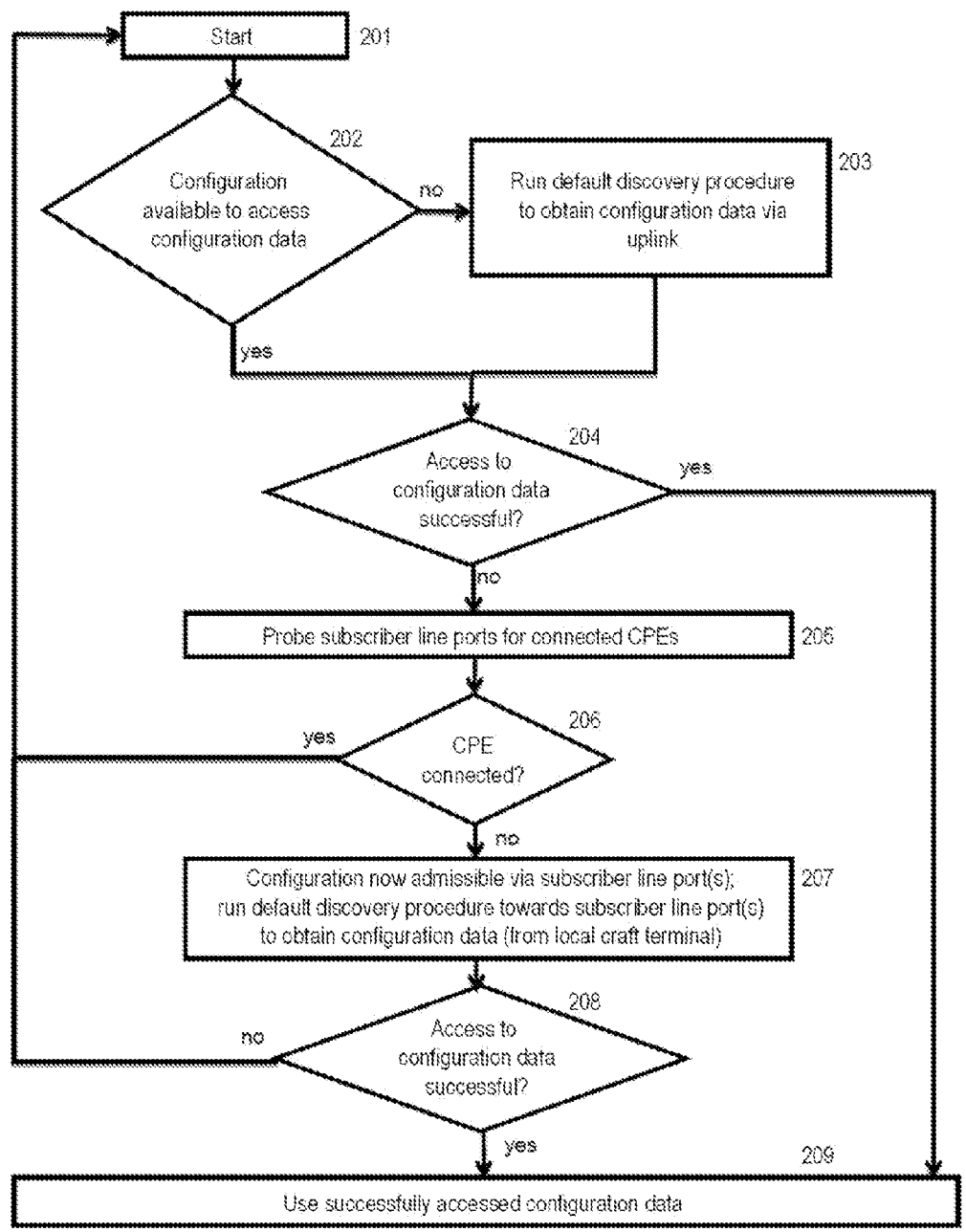
FIG. 2 shows an example flow diagram comprising steps of a special procedure executed at the DPU.

FIG. 2 shows an example flow diagram comprising steps of such a special procedure of the DPU:

Step 201: The special procedure is started; next is step 202.

Step 202: It is checked whether a (persistent) configuration information for accessing the configuration data is available. In the affirmative, it is continued with step 204, otherwise it is branched off to step 203.

Step 203: A default discovery procedure is executed to connect in order to obtain configuration data through a default in-band management channel from the CO. This may or may not be successful. It is continued with step 204.

Step 204: It is checked whether the configuration data was found in step 202 or obtained in step 203. In the affirmative, it is continued with step 209, otherwise it is branched off to step 205.

Step 205: Subscriber line ports of the DPU are probed for connected CPEs. This may refer to all subscriber line ports or to a selection of, e.g., dedicated, subscriber line ports. Next is step 206.

Step 206: It is checked whether a connection to a CPE was found. In the affirmative, it is branched off to step 201. As at least one CPE is connected to the subscriber line ports, no configuration will be conducted. In such case, fault handling may be triggered, e.g., by indicating an error via an LED.

If no CPE was found, it is branched off to step 207.

Step 207: The role of the DPU is changed, i.e. configuration may now be possible via at least one of its subscriber line ports. The default discovery procedure that would otherwise be executed towards the uplink media port 108 is now executed towards the at least one downlink subscriber line port 106 and hence reach the local craft terminal 101 via the media converter 104. This discovery procedure aims at obtaining configuration data from the local craft terminal 101. Next is step 208.

Step 208: It is checked whether such access to configuration data was successful. In the affirmative, it is branched off to step 209. If no configuration data was found, fault handling could be performed (e.g., indicating an error via an LED) and/or it can be branched off to step 201 re-starting this procedure.

Step 209: The successfully accessed configuration data is used and the configuration successfully terminates.

In order to connect and operate the local craft terminal 101, an operator may disconnect the at least one subscriber line from the subscriber line ports 106 of the DPU 107 and then connect the subscriber line ports 106 to the subscriber line ports 105 of the media converter 104. Once local craft terminal 101, media converter 104 and DPU 107 are powered up, a DPU management application may automatically run the special procedure described above thereby establishing a connection to the software of the local craft terminal 101 to configure the DPU 107.

For security reasons it is beneficial that the DPU 107 also implements identification and/or authentication methods to avoid that any unwanted local craft terminal and/or user obtains access.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

List of Abbreviations

CO Central Office
CPE Customer Premises Equipment
DPU Distribution Point Unit
DSL Digital Subscriber Line
DSLAM DSL Access Multiplexer
FTU Fast Transceiver Unit
FTU-O FTU at the Optical Network Unit (or central office, exchange, cabinet, distribution point, etc., i.e., operator end of the loop)
FTU-R FTU at the Remote site (i.e., subscriber end of the loop)
GPON Gigabit PON
MDU Multi-Dwelling Unit
PON Passive Optical Network
VDSL Very High Speed Digital Subscriber Line

What is claimed is:

1. A method for utilizing interfaces of a network access device, wherein the network access device comprises a downlink interface with at least one subscriber port that provides a subscriber with a connection to the network access device and a network interface that provides the network access device with a connection to an optical network, the method comprising:
checking whether configuration data can be obtained via an uplink to the optical network through the network interface; and
if the configuration data cannot be obtained from the uplink to the optical network through the network interface:
determining whether at least one subscriber port of the downlink interface is not connected to a device of the subscriber; and
in response to determining that the at least one subscriber port of the downlink interface is not connected to the device of the subscriber, enabling the downlink interface for configuration purposes.

2. The method of claim 1, comprising:
in response to determining that all subscriber ports of the downlink interface are connected to devices of subscribers, not enabling the downlink interface for configuration purposes.

3. The method of claim 1, wherein the network access device is a distribution point unit or a multi-dwelling unit.

4. The method of claim 1, wherein the downlink interface comprises several subscriber line ports, each of which being connectable to a customer premises equipment.

5. The method of claim 1, wherein the network interface comprises at least one optical interface that is connectable directly or via an optical splitter to a central office.

6. The method of claim 1, wherein the configuration data is used to configure the network access device.

7. The method of claim 1, further comprising:
if the configuration data can be obtained from the uplink to the optical network through the network interface, using such configuration data for configuring the network access device.

8. The method of claim 1, wherein:
determining whether at least one subscriber port of the downlink interface is not connected to a device of the subscriber comprises determining that no port of the downlink interface is connected to a device of a subscriber; and
enabling the downlink interface for configuration purposes is conditioned on no port of the downlink interface being connected to a device of a subscriber.

9. The method of claim 1, wherein enabling the downlink interface for configuration purposes requires a successful identification or authentication in addition to the determination that at least one subscriber port of the downlink interface is not connected to the device of the subscriber.

10. A network access device, comprising
a downlink interface with at least one subscriber port;
a network interface that provides the network access device with a connection to an optical network;
a processing unit, wherein the processing unit is arranged to check whether configuration data can be obtained an uplink to the optical network through the network interface, and further arranged to perform operations of:
if the configuration data cannot be obtained from the uplink to the optical network through the network interface:
determining whether at least one subscriber port of the downlink interface is not connected to a device of a subscriber; and
in response to determining that the at least one subscriber port of the downlink interface is not connected to the device of the subscriber, enabling the downlink interface for configuration purposes.

11. The network access device of claim 10, further comprising:
a media converter; and
a terminal for configuring the network access device via its downlink interface via the media converter.

12. A non-transitory computer readable medium storing instructions that upon execution by one or more processors cause the one or more processors to perform operations including:
checking whether configuration data can be obtained by a network access device via an uplink to an optical network through a network interface that provides the network access device with a connection to the optical network;
if the configuration data cannot be obtained from the uplink to the optical network through the network interface:
determining whether at least one subscriber port of a downlink interface is not connected to a device of a subscriber, wherein the at least one subscriber port of the downlink interface is a port that provides a subscriber with a connection to the network access device; and
in response to determining that the at least one subscriber port of the downlink interface is not connected to the device of the subscriber, enabling the downlink interface for configuration purposes.

13. The computer readable medium of claim 12, wherein the instructions cause the one or more processors to perform operations comprising:
in response to determining that all subscriber ports of the downlink interface are connected to devices of subscribers, not enabling the downlink interface for configuration purposes.

14. The computer readable medium of claim 12, wherein the instructions cause the one or more processors to perform operations further comprising:
if the configuration data can be obtained from the uplink to the optical network through the network interface, using such configuration data for configuring the network access device.

15. The computer readable medium of claim 12, wherein the downlink interface is used for obtaining configuration data from a terminal that is directly or indirectly connectable to the at least one subscriber line port of the downlink interface, and wherein the instructions cause the one or more processors to perform operations including using such configuration data for configuring the network access device.

* * * * *